(12) United States Patent
Tennent et al.

(10) Patent No.: US 7,977,266 B2
(45) Date of Patent: Jul. 12, 2011

(54) ALUMINUM TITANATE CERAMIC FORMING BATCH MIXTURES AND GREEN BODIES WITH PORE FORMER

(75) Inventors: David Lambie Tennent, Campbell, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 390 days.

(21) Appl. No.: 12/156,255

(22) Filed: May 30, 2008

(65) Prior Publication Data

US 2008/0300127 A1 Dec. 4, 2008

Related U.S. Application Data

(60) Provisional application No. 60/932,476, filed on May 31, 2007.

(51) Int. Cl.
   C04B 35/00 (2006.01)
   C04B 38/00 (2006.01)
   C04B 38/06 (2006.01)

(52) U.S. Cl. ............................. 501/134; 501/80; 501/81

(58) Field of Classification Search .................... 501/39, 501/80–83, 85, 134, 99, 100
   See application file for complete search history.

(56) References Cited

U.S. PATENT DOCUMENTS

| | | | |
|---|---|---|---|
| 4,279,849 A | 7/1981 | Ogawa et al. | 264/63 |
| 4,557,773 A | 12/1985 | Bonzo | 156/64 |
| 5,069,697 A | 12/1991 | Hamaguchi et al. | 55/523 |
| 5,183,609 A | 2/1993 | Miyahara | 264/44 |
| 5,219,802 A | 6/1993 | Hsiao et al. | 501/81 |
| 5,256,347 A | 10/1993 | Miyahara | 264/40 |
| 5,262,102 A | 11/1993 | Wada | 264/66 |
| 6,620,751 B1 | 9/2003 | Ogunwumi | 501/134 |
| 6,696,132 B2 | 2/2004 | Beall et al. | 428/116 |
| 6,773,481 B2 | 8/2004 | Noguchi et al. | 55/523 |
| 6,803,086 B2 | 10/2004 | Noguchi et al. | 428/116 |
| 6,818,580 B2 | 11/2004 | Kumazawa et al. | 501/119 |
| 6,942,713 B2 * | 9/2005 | Ogunwumi et al. | 55/523 |

(Continued)

FOREIGN PATENT DOCUMENTS

WO 2005/046840 5/2005

(Continued)

OTHER PUBLICATIONS

E. Vileno, J. George, K. Koch, G. Squier, "Measurement & Calculation of the Effective Dielectric Properties for Partially, Structured Geometries," Microwave and Radio Frequency Applications, Proceedings of the Fourth World Congress on Microwave and Radio Frequency Applications, (426-433), The Microwave Working Group, Ltd., 2004.

(Continued)

*Primary Examiner* — Jerry Lorengo
*Assistant Examiner* — Noah S Wiese
(74) *Attorney, Agent, or Firm* — Joseph M. Homa

(57) ABSTRACT

A ceramic forming batch mixture including inorganic batch materials, such as sources of alumina, titania, and silica, a low amount of one or more pore formers including at least one starch; an organic binder; and a solvent. Also disclosed is a method for producing a ceramic article involving mixing the inorganic batch materials with the low amount of pore former, adding an organic binder and a solvent, forming a green body; and firing the green body. A green body having a low amount of the one or more pore formers including starch is disclosed.

5 Claims, 2 Drawing Sheets

U.S. PATENT DOCUMENTS

| | | |
|---|---|---|
| 7,001,861 B2 | 2/2006 | Beall et al. .................... 501/128 |
| 7,071,135 B2 | 7/2006 | Ogunwumi et al. .......... 501/134 |
| 7,208,108 B2 | 4/2007 | Otsuka et al. ................... 264/44 |
| 2003/0151155 A1 | 8/2003 | Muroi et al. .................... 264/44 |
| 2005/0046063 A1 | 3/2005 | Toda et al. ...................... 264/44 |
| 2006/0021309 A1* | 2/2006 | Merkel ............................ 55/523 |
| 2007/0006561 A1* | 1/2007 | Brady et al. .................... 55/523 |
| 2008/0125305 A1* | 5/2008 | Day et al. ........................ 501/80 |
| 2009/0011176 A1* | 1/2009 | Ichikawa ....................... 428/116 |

FOREIGN PATENT DOCUMENTS

| | | |
|---|---|---|
| WO | 2005/051859 | 6/2005 |
| WO | 2006/015240 | 2/2006 |
| WO | 2006/028506 | 3/2006 |
| WO | 2008/005249 | 1/2008 |

OTHER PUBLICATIONS

A.C. Metaxes, R.J. Meredith, Industrial Microwave Heating, (78-82). Peter Peregrinus Ltd., London, England, 1983.

\* cited by examiner

ALUMINUM TITANATE CERAMIC FORMING BATCH MIXTURES AND GREEN BODIES WITH PORE FORMER

RELATED APPLICATIONS

This application claims the benefit of U.S. Provisional Application No. 60/932,476, filed May 31, 2007, entitled "Aluminum Titanate Ceramic Forming Batch Mixtures and Green Bodies with Pore Former."

FIELD

The present invention is directed to aluminum-titanate-ceramic-forming batch mixtures with pore former and aluminum-titanate-ceramic-forming green bodies with pore former, and methods for manufacturing aluminum titanate ceramic bodies.

BACKGROUND

Exhaust gases emitted by internal combustion systems utilizing hydrocarbon fuels, such as hydrocarbon gases, gasoline, or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has, for many years, attempted to reduce the quantities of pollutants from automobile engine systems, the first automobiles equipped with catalytic converters having been introduced in the mid 1970's. Cordierite substrates, typically in the form of a honeycomb body, have long been preferred for use as substrates to support catalytically-active components for catalytic converters on automobiles.

Aluminum titanate ceramics have emerged as an excellent candidate for high-temperature applications. In order to achieve the desired porosity in such aluminum titantate materials, graphite pore formers have been added to the inorganic batch materials. However, the addition of graphite undesirably may result in very long firing cycles (for example, in excess of 180 hours) to achieve burnout of the graphite without causing part cracking. Furthermore, high levels of graphite are not desired because of the adverse effect on dielectric drying, a conventional approach for drying green bodies formed of inorganic materials.

SUMMARY

Disclosed herein are aluminum-titanate-ceramic-forming batch mixtures with pore former and aluminum-titanate-ceramic-forming green bodies with pore former that are more conducive to drying, yet still result in a fired article having desired porosity.

According to one aspect, an aluminum titanate ceramic forming batch mixture is disclosed herein comprising: inorganic batch materials comprising sources of alumina, titania, and silica; a pore former comprising a starch, wherein the pore former is in less than 15%, by weight, of the inorganic batch material; an organic binder; and a solvent.

In another aspect, an aluminum titanate ceramic forming green body is disclosed herein comprising: a homogeneous mixture of inorganic batch materials including sources of alumina, titania, and silica; a pore former comprising starch, wherein the pore former is in less than 15%, by weight, of the inorganic batch materials; and an organic binder; wherein said green body includes a plurality of interconnected cell walls forming a plurality of cell channels traversing the body.

In another aspect, a method of manufacturing an aluminum titanate containing ceramic article is disclosed herein, the method comprising the steps of: mixing inorganic batch materials with a pore former to form a batch composition, wherein the pore former is in less than 15%, by weight, of the inorganic batch material; adding an organic binder and a solvent to the batch composition and further mixing to form a plasticized mixture; forming a green body from the plasticized mixture; and firing the green body to produce a predominant phase of aluminum titanate.

In another aspect, a method of manufacturing an aluminum titanate containing ceramic article is disclosed herein, the method comprising the steps of: mixing inorganic batch materials with a pore former to form a batch composition, wherein the pore former comprises graphite in less than 10%, by weight, of the inorganic batch material and wherein the pore former comprises no thermoplastic polymer; adding an organic binder and a solvent to the batch composition and further mixing to form a plasticized mixture; forming a green body from the plasticized mixture; and firing the green body to produce a predominant phase of aluminum titanate, thereby resulting in a fired ceramic article with a porosity greater than 40%. In some embodiments, the pore former comprises graphite less than 8%, by weight, of the inorganic batch material. In some embodiments, the ceramic article has porosity greater than 40% and less than 50%.

DETAILED DESCRIPTION

The batch mixtures according to embodiments disclosed herein contain aluminum titanate ceramic forming compositions with a pore former. The pore former may consist of a single pore forming agent, for example starch, or may comprise more than one pore forming agent, such as starch and graphite. The "pore former" is a batch addition which helps the resultant produced ceramic article to have interconnected pores (voids) formed therein upon completion of the firing cycle. The pore former preferably burns out (decomposes or oxidizes, and preferably is converted to produce a gas, such as CO or $CO_2$) and leaves behind the desired void or porosity, which is preferably open-interconnected porosity, within the final aluminum titanate ceramic article as the article is being fired. This "burning-out" of the pore former occurs, preferably, before the formation of the principal ceramic phase, such as a phase of aluminum titanate. The use of two or more different pore forming agents can space out the exothermic reactions associated with burn out, such that the overall temperature peaks are lowered as compared to a single pore forming agent (for example, using graphite alone).

Figure 1:
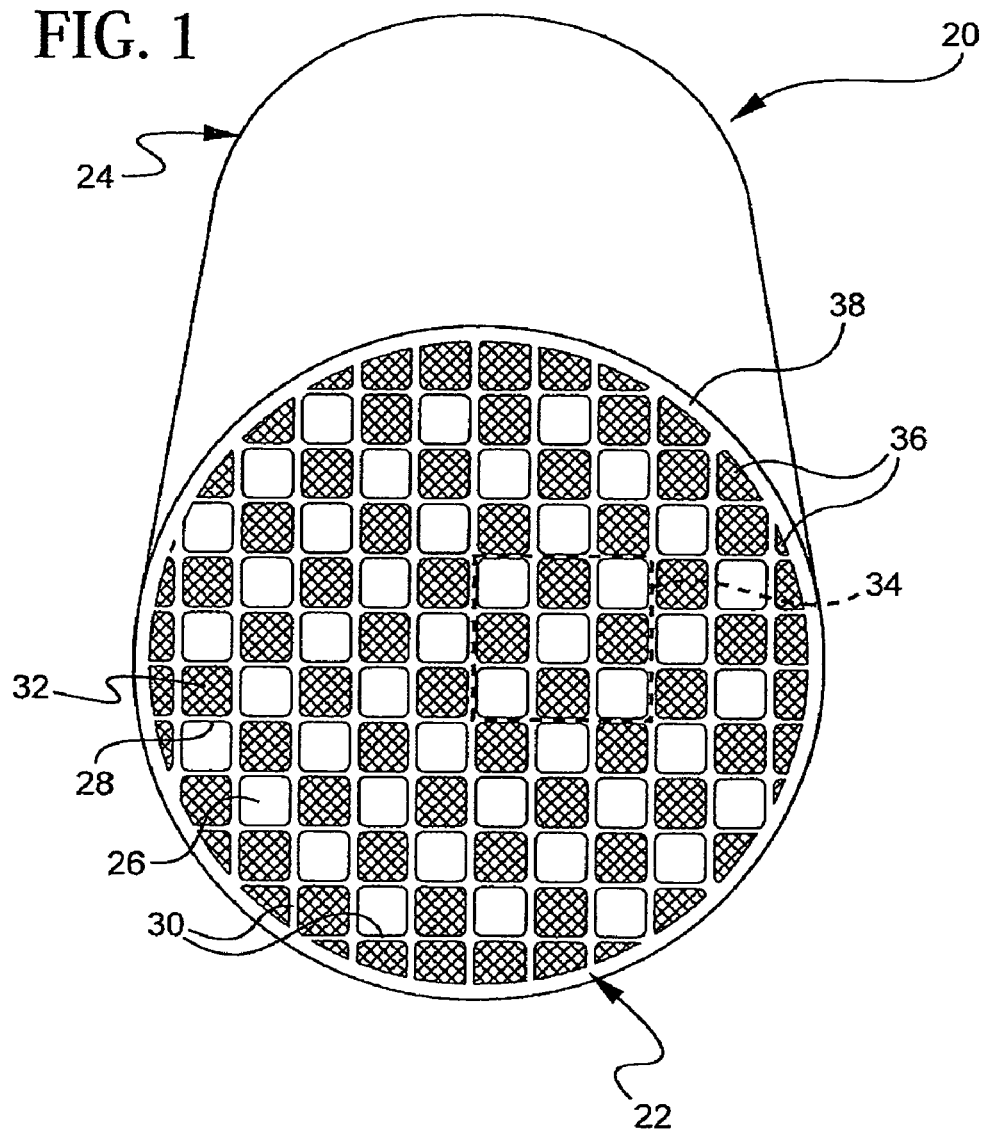
FIG. 1 is a frontal isometric view of an aluminum titanate ceramic article embodied as a particulate filter according to an aspect of the invention.

In some embodiments, a ceramic article disclosed herein comprises a ceramic honeycomb body comprised of a plurality of intersecting cell walls; in some embodiments, the ceramic article is a substrate, which is for example capable of being coated with a catalyst, such as a catalyzed flow-through substrate; in other embodiments, a plurality of the cells of the honeycomb body of the ceramic article is plugged, for example to form a wall-flow filter. A ceramic article 20, for example containing an aluminum titanate phase, is shown in FIG. 1. Preferably the article 20 comprises a honeycomb body comprised of a plurality of intersecting cell walls 30. In some embodiments, this article 20 is preferably configured as a particulate filter and includes an inlet end 22 which is exposed in use to an incoming exhaust stream, and an outlet end 24 opposed thereto, through which the filtered exhaust gases exit. This article 20 includes a plurality of inlet channels 26 extending and traversing along the length of the filter, and a plurality of exit channels 28 also extending and traversing along the length of the filter alongside the inlet channels 26. In the embodiment shown, the shape of the channels is generally square and they may include small radii or bevels on the corners thereof; alternatively or in addition the shape of the channels (e.g. the cross-sectional shape of the channel in a transverse plane perpendicular to the longitudinal axis of article) can have other shapes. Although not shown, it should be recognized also that the cross-sectional area of each of the inlet and outlet channels 26, 28 can be different. For example, the average inlet area of inlet channels may be larger than the average outlet area of the outlet channels. Other channel shapes such as rectangular, triangular, octagon, hexagon, circular, or combinations are possible as well. Intersecting cell walls 30 are formed preferably by extruding the inventive batch mixture composition according to the invention through an extrusion die to form an extruded green body. Although extrusion is the preferred forming method, it should be recognized that the forming step may include any known method for forming green bodies.

Figure 2:
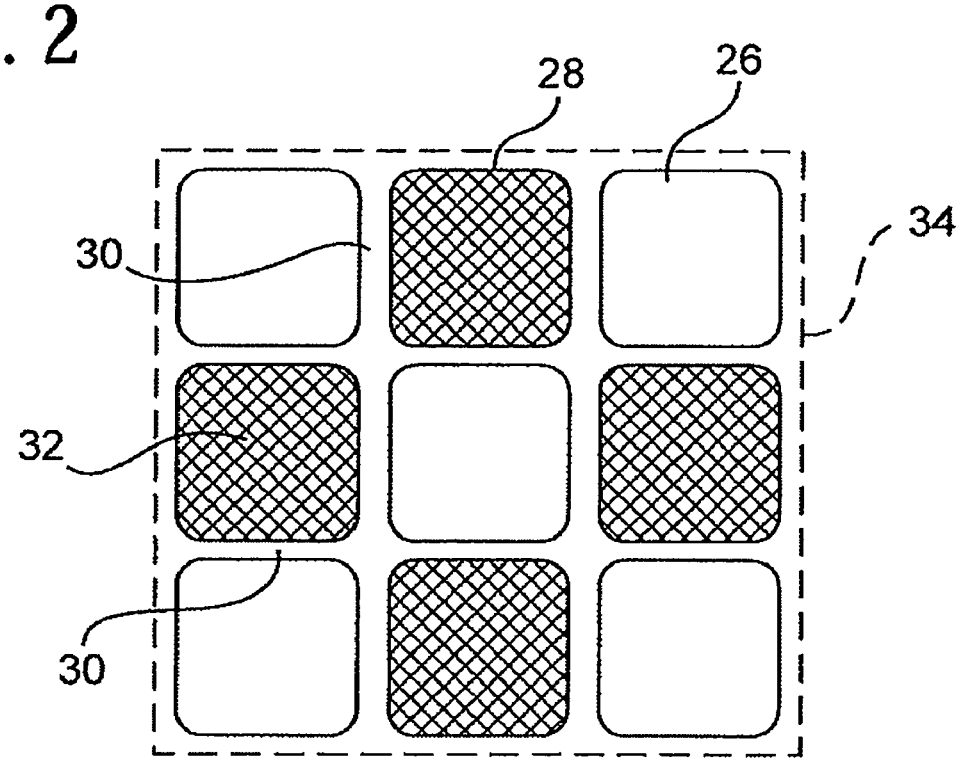
FIG. 2 is an enlarged partial frontal view of a portion of the particulate filter of FIG. 1.

Referring to FIGS. 1 and 2, within the filter article 20, respective inlet 26 and outlet 28 channels are preferably plugged with suitable plugs 32 at the inlet 22 and outlet 24 ends. For clarity in FIG. 2, the plugs are not shown on the outlet end. However, it should be understood that the inlet channels 26 are plugged at the outlet end 24 whereas the outlet channels are plugged at the inlet end 22. FIG. 2 shows an enlarged view 34 of part of FIG. 1, showing the plugs 32 formed in a checkerboard pattern on a portion of the inlet end 22. Plugs are preferably made from suitable ceramic material and extend radially across and between the intersecting walls 30 to close off (i.e. seal) an end of each of the channels. Plugs may be formed by the method described in U.S. Pat. No. 4,557,773, for example. However, any suitable plugging technique may be used. Further, partial channels 36 (e.g. channels which do not share a common shape with the majority of channels on a transverse plane of the article, such as at or near the outer periphery of the honeycomb body) adjacent to the skin 38 may be plugged on both ends to add strength, if desired. Moreover, although the article described above is a particulate wall-flow filter, it should be recognized that the present invention batch mixture and firing and manufacturing methods may also be useful for non-filter applications, for example, as catalyzed flow-through substrates.

The median pore diameter, $d_{10}$, of a fired ceramic article is the pore diameter at which the cumulative mercury intrusion volume equals 10% of the total mercury intrusion volume. The median pore diameter, $d_{50}$, is the pore diameter at which the cumulative mercury intrusion volume equals 50% of the total mercury intrusion volume. One measure of the pore size distribution of a ceramic article is characterized by a $d_{factor}$, wherein $d_{factor}=(d_{50}-d_{10})/d_{50}$.

As was discovered, the pore former amounts and/or combinations according to aspects of the invention, advantageously promote more rapid burnout of the pore formers within the aluminum titanate forming green body, as compared to batch mixtures of the prior art. More particularly, it has been discovered that low levels of pore former(s), and in some embodiments combinations of certain types and preferable amounts of pore formers, not only may provide levels of porosity at greater than 40%, but they may also result in shorter firing cycles for aluminum titanate articles. Moreover, such aluminum-titanate-forming compositions including the pore former combination may reduce the overall propensity of the resultant ceramic parts to crack upon firing. In some embodiments, the porosity of the fired ceramic article is less than 50%, which can result in stronger ceramic (e.g. honeycomb) bodies (e.g. substrates or filters); in some embodiments, the porosity of the fired ceramic article is greater than 40% and less than 50%. We have also discovered that the amount of graphite in the batch mixture and in the green body should be limited in order to enhance drying and limit cracking.

As disclosed herein, the batch also includes a pore former comprising a starch, wherein the pore former is in less than 15%, by weight, of the inorganic batch material. The pore former may comprise other pore forming agents in addition to the starch. The starch may comprise one starch or more than one starch. The starch is preferably selected from a group consisting of corn starch, barley starch, bean starch, potato starch, rice starch, tapioca starch, pea starch, sago palm starch, wheat starch, canna starch, and combinations thereof. In some embodiments, the starch constitutes no less than 1% and no more than 8%, by weight, of the inorganic batch materials; in other embodiments, the starch constitutes no less than 2% and no more than 8%, by weight, of the inorganic batch materials; in other embodiments, the starch constitutes more than 3.0% and less than 7.0%, by weight, of the inorganic batch materials.

In some embodiments, the inorganic batch materials contain more than 1% and less than 8%, by weight, of the pore former; in other embodiments, the inorganic batch materials contain no less than 2% and less than 8%, by weight, of the pore former.

In some embodiments, the pore former preferably comprises essentially no thermoplastic polymer; more preferably, the pore former comprises no thermoplastic polymer. Examples of thermoplastic polymers include polybutylene, polymethylpentene, polyethylene (such as polyethylene beads), polypropylene (such as polypropylene beads), polystyrene, polyamides (nylons), acrylonitrile butadiene styrene (ABS), Acrylics, polyesters (PET), polyurethanes, polymethylmethacrylate (PMMA), or the like. In some embodiments, the pore former contains no thermoplastic polymer or epoxy.

In some embodiments, the pore former comprises starch and graphite, and in some of these embodiments, the graphite is in no more than 8%, by weight, of the inorganic batch materials; in other embodiments, the graphite is in no less than 2% and no more than 8%, by weight, of the inorganic batch materials. In some embodiments, the starch is in no more than 8%, by weight, of the inorganic batch materials, and the graphite is in no more than 8%, by weight, of the inorganic batch materials. In other embodiments, the starch is in less than 8%, by weight, of the inorganic batch materials, and the graphite is in less than 8%, by weight, of the inorganic batch materials. In some embodiments, the batch mixture includes the starch in no less than 2% and no more than 8%, by weight, of the inorganic batch materials, and the graphite in no less than 2% and no more than 8%, by weight, of the inorganic batch materials.

In some of the above embodiments, the pore former consists of the starch and graphite.

As disclosed herein, the pore former may comprise a first pore forming agent, or first pore former component, and a second pore forming agent, or second pore former component, having a different composition than the first pore former component. In some embodiments, the first pore former component is selected from a group consisting of corn starch, barley starch, bean starch, potato starch, rice starch, tapioca starch, pea starch, sago palm starch, wheat starch, canna starch, and combinations thereof, and the second pore former component is selected from a group consisting of graphite, activated carbon, petroleum coke, carbon black, and combinations thereof. In some of these embodiments, the first pore former component constitutes less than 8%, by weight, of the inorganic batch materials and the second pore former component constitutes less than 8%, by weight, of the inorganic batch materials. For example, the first pore former component is a starch and the second pore former component is graphite; in some of these embodiments, the starch constitutes less than 8%, by weight, of the inorganic batch materials and the graphite constitutes less than 8%, by weight, of the inorganic batch materials, and preferably the starch constitutes more than 1% and less than 8%, by weight, of the inorganic batch materials and the graphite constitutes more than 1% and less than 8%, by weight, of the inorganic batch materials.

In another aspect, an aluminum titanate ceramic forming green body is disclosed herein comprising: a homogeneous mixture of inorganic batch materials including sources of alumina, titania, and silica; a pore former comprising starch, wherein the pore former is in less than 15%, by weight, of the inorganic batch materials; and an organic binder, wherein said green body includes a plurality of interconnected cell walls forming a plurality of cell channels traversing the body.

In another aspect, a method of manufacturing an aluminum titanate containing ceramic article is disclosed herein, the method comprising the steps of: mixing inorganic batch materials with a pore former to form a batch composition, wherein the pore former is in less than 15%, by weight, of the inorganic batch material; adding an organic binder and a solvent to the batch composition and further mixing to form a plasticized mixture; forming a green body from the plasticized mixture; and firing the green body to produce a ceramic body comprising a predominant phase of aluminum titanate. Preferably, the ceramic body has a porosity of greater than 40%; in some embodiments, the porosity is greater than 40% and less than 50%; in other embodiments, the porosity is less than 50%.

As measured herein, the pore former is a super addition to the inorganic batch materials.

Thus, it has been found that by utilizing the low amount of pore former in the aluminum titanate batch mixture, the mixture described herein (upon being formed into a green body and fired) results in a sintered ceramic article, characterized by a primary crystalline phase of aluminum titanate, and which also exhibits desirable physical properties. In particular, the ceramic article so produced has a porosity of greater than 40%, and in some embodiments greater than 40% and less than 50% (as measured by mercury porosimetry); in some embodiments, Median Pore Size (MPS) for the article is less than 15.0 µm, and in other embodiments between 8.0 and 15.0 µm. In some embodiments, the $(d_{50}-d_{10})/d_{50}$ is less than 0.7, and in some of these embodiments between 0.2 and 0.7. The present invention is particularly useful for producing honeycomb aluminum titanate ceramic articles, and more particularly for producing aluminum-titanate-containing ceramic particulate filters useful for filtering particulate matter from exhaust streams as shown and described with reference to FIGS. 1 and 2.

For the inventive batch mixtures described herein, a suitable source of alumina is a powder which when heated to a sufficiently high temperature in the absence of other raw materials, will yield substantially pure aluminum oxide. Such suitable alumina sources include alpha-alumina, a transition alumina such as gamma-alumina or rho-alumina, hydrated alumina, gibbsite, corundum ($Al_2O_3$), boehmite ($AlO(OH)$), pseudoboehmite, aluminum hydroxide ($Al(OH)_3$), aluminum oxyhydroxide, or the like, and mixtures thereof. The median particle diameter of the source of alumina is preferably below 35 microns.

A suitable titania source is rutile, anatase, or an amorphous titania. The median particle size of the titania source is important to avoid entrapment of unreacted oxide by the rapidly growing nuclei in the structure. Accordingly, the median particle size is preferably less than 20 micrometers.

Suitable silica sources include non-crystalline silica such as fused silica or sol-gel silica, silicone resin, low-alumina substantially alkali-free zeolite, diatomaceous silica, kaolin, and crystalline silica, such as quartz or cristobalite. Additionally, the silica-forming source can comprise a compound that forms free silica, when heated, for example, silicic acid or a silicon organometallic compound. The median particle size of the silica source is preferably less than 30 micrometers.

If strontium is employed as the preferred alkaline earth metal oxide, then a suitable strontium source is strontium carbonate, with a median particle size of preferably less than 20 micrometers. If barium is employed, suitable preferred barium sources are barium carbonate, barium sulfate, or barium peroxide, with a preferable median particle size of less than 20 micrometers. If calcium is used, the calcium source may be either calcium carbonate or calcium aluminate, with a median particle size of preferably less than 20 micrometers.

If a rare earth is employed, then a suitable source of rare earth oxide is lanthanum oxide ($La_2O_3$), yttrium oxide ($Y_2O_3$), any oxide of the lanthanide series, or combinations thereof.

The aforementioned raw inorganic batch materials are preferably combined as powdered materials in a mixing step sufficient to produce an intimate mixing of the inorganic raw materials. The pore former may be added to this mix, either simultaneously or with the other batch components or after the inorganic materials are intimately mixed. In any event, the pore former is intimately mixed with the inorganic batch materials to form a homogeneous, preferably powdered mixture of the inorganic materials and pore former.

An organic binder system is also added to the batch inorganic materials and pore former to help create an extrudable mixture that is both formable and moldable. A preferred multi-component organic binder system for use in the present invention preferably includes a binder of a cellulose-containing component, a surfactant component, and a solvent. The binder system may also include a base such as triethanol amine (TEA), preferably added at 0.1 to 0.5%, which acts as a dispersant to help disperse the surfactant. The cellulose-containing component may be, for example, an organic cellulose ether binder component selected from the group consisting of methylcellulose, methylcellulose derivatives, and combinations thereof. The surfactant component is preferably oleic acid or tall oil. Finally, the solvent may be water, most preferably ionized water. However, it should be recognized that although this binder system is preferred, any suitable organic binder system may be employed for use with the present invention. Excellent results have been obtained utilizing a binder system which comprises the following amounts, assuming 100 parts by weight of the inorganic materials, about 0.2 to 2.0 parts by weight of the oleic acid or tall oil, about 2.5 to 6.0 parts by weight of a methylcellulose or a hydroxypropyl methylcellulose binder, and about 10-30 parts by weight of water.

The individual components of the binder system are mixed with a mass of the inorganic powder materials and pore former, in any suitable known manner, to prepare an intimate homogeneous mixture of the inorganic powder material, pore former, and binder system. This aluminum titanate forming batch mixture is capable of being formed into a ceramic forming green body, for example, preferably by extrusion. For example, all components of the binder system may be previously mixed with each other, and the mixture is then added to the powdered inorganic material previously mixed with the pore former. In this case, the entire portion of the binder system may be added at one time, or divided portions of the binder system may be added one after another at suitable intervals. Alternatively, the components of binder system may be added to the ceramic batch materials one after another, or each previously prepared mixture of two or more components of the binder system may be added to the ceramic powder material and pore former combination. For example, the dry components may be first added to the inorganic batch materials and pore former, followed by the liquid components. Further, the binder system may be first mixed with a portion of the ceramic forming powder material. In this case, the remaining portion of the ceramic forming powder is subsequently added to the prepared mixture. In any case, it is preferred that the binder system be uniformly mixed with the inorganic batch powders and pore former in a predetermined portion to form a homogeneous batch mixture. Uniform mixing of the binder system, the ceramic inorganic materials, and the pore former may be accomplished by any known kneading process.

The resulting stiff, uniform, homogeneous, and extrudable batch mixture is then further plasticized and shaped or otherwise formed into a green body. Such shaping or forming may be accomplished by any known conventional ceramic forming process, such as, e.g. extrusion, injection molding, slip casting, centrifugal casting, pressure casting, press molding, etc. For the preparation of a thin-walled honeycomb substrate suitable for use as a catalyst support or as a particulate filter, extrusion through a slotted extrusion die is preferable. For example, U.S. Pat. No. 6,696,132 discloses a "Honeycomb With Varying Size and Die For Manufacturing."

The prepared (preferably extruded) aluminum titanate ceramic forming green body thus formed from the plasticized extrudable batch mixture is then preferably dried prior to firing. Drying may be achieved by, for example, drying methods such as hot-air, electromagnetic energy drying (e.g., RF or microwave), vacuum drying, freeze drying, or combinations may be used. The dried green body is thereafter suitably fired by heating to a sufficient top temperature for a sufficient time to result in a fired ceramic body. Aluminum titanate is the primary crystal phase formed as a result of firing the green body manufactured from the inventive batch mixture described hereinabove.

The firing conditions may be varied depending on the process conditions such as specific composition of the batch, size of the green body, and nature of the equipment, but preferably include burning out the pore former, in order to produce the aluminum titanate phase when utilizing the batch mixtures described herein. In some embodiments, the green body is heated in a furnace to a top temperature (the highest temperature of the cycle) preferably in the temperature range having an upper limit below 1550° C. and a lower limit of above 1350° C., and in some embodiments below 1460° C. and above 1420° C. and held at this temperature range for greater than 4 hours, preferably between 4-30 hours, and in some embodiments between 6-20 hours. During firing, a predominant ceramic crystal phase is formed in the ceramic article, which is of aluminum titanate for the batch described above.

As indicated previously, a primary utility of the batch mixtures described herein is for preparing high strength aluminum titanate containing honeycomb articles useful as catalyst carriers and/or diesel particulate filters (which may also include a catalyst).

To further illustrate the principle aspects of the present invention, there will be described numerous examples of the ceramic-forming batches and ceramic articles formed utilizing the present invention. However, it is to be understood that the examples are given for illustrative purpose only, and the invention is not limited thereto, but various modifications and changes may be made in the invention, without departing from the scope of the invention.

Examples

Inorganic powder batch mixtures suitable for the formation of a ceramic article having aluminum titanate as its primary crystalline phase are listed in Table I.

TABLE 1

| Inorganic batch materials: | wt % |
| --- | --- |
| $SiO_2$ (Cerasil 300) | 10.19 |
| $SrCO_3$ (CPC Type W) | 8.00 |
| $CaCO_3$ (OMYA Hydrocarb OG) | 1.38 |
| $Al_2O_3$ (Almatis A10) | 46.57 |
| $TiO_2$ (DuPont Ti-pure) | 29.95 |
| $Al(OH)_3$ (Huber SB8000) | 3.71 |
| $La_2O_3$ (MolyCorp) | 0.20 |

Each of the Examples A-N in Table II was prepared by combining and dry mixing together the inorganic components of the designated inorganic mixture as listed in Table I, and to these dry mixtures was added an amount of the pore former as designated in Table II, namely potato starch (Emsland Starke), corn starch (National Starch), and/or graphite (Asbury 4602). Further, an organic binder system consisting of 4.50 wt % methylcellulose (Dow F240 "methocel") and 1.00 wt % Tall Oil (Westvaco) was added to each and this intermediate mixture was thereafter further mixed with 14-17 wt % liquid addition. The liquid addition is a mix of de-ionized water (as the solvent to form a plasticized ceramic batch mixture), the surfactant (tall oil), and a dispersant (TEA). The binder system components and pore former, as detailed herein, are listed in % by weight, based on 100% of the total inorganics.

TABLE II

| Example | Potato Starch wt % | Corn Starch wt % | Graphite wt % | Total Pore Former(s) wt % | Liquid Addition wt % |
| --- | --- | --- | --- | --- | --- |
| A | 8 | — | 6 | 14 | 16.5 |
| B | 6 | — | 7.5 | 13.5 | 16.5 |
| C | 8 | — | 3.5 | 11.5 | 15.5 |
| D | 4 | — | 5 | 9 | 15.5 |
| E | 6.5 | — | — | 6.5 | 15 |
| F | 3.25 | — | — | 3.25 | 14 |
| G | 2 | — | 2.5 | 4.5 | 14 |
| H | — | 8 | 6 | 14 | 16.5 |
| I | — | 6 | 7.5 | 13.5 | 16.5 |
| J | — | 8 | 3.5 | 11.5 | 15.5 |
| K | — | 4 | 5 | 9 | 15.5 |
| L | — | 6.5 | — | 6.5 | 15 |
| M | — | 3.25 | — | 3.25 | 14 |
| N | — | 2 | 2.5 | 4.5 | 14 |

The oxide weights of the components in the resulting material composition of the final ceramic articles were: 51.12 wt % $Al_2O_3$, 31.33 wt % $TiO_2$, 10.65 wt % $SiO_2$, 5.87 wt % SrO, 0.83 wt % CaO, 0.2 wt % $La_2O_3$. Table III reports the porosity, pore size, and pore size distribution parameter, $(d_{50}-d_{10})/d_{50}$ for each of the final ceramic articles of Examples A-N.

Table III reports porosity, median pore size, and $(d_{50}-d_{10})/d_{50}$ for the material composition of the final ceramic article, wherein each of the various plasticized mixtures of Examples A-N were extruded through an extrusion die under conditions suitable to form honeycomb articles having 300 cell/in$^2$ (46.5 cells/cm$^2$) and 12 mil (0.305 mm) thick cell walls.

TABLE III

| Example | Potato Starch wt % | Corn Starch wt % | Graphite wt % | Total Pore Former(s) wt % | Porosity % | Median Pore Size μm | $(d_{50}-d_{10})/d_{50}$ |
|---|---|---|---|---|---|---|---|
| A | 8 | — | 6 | 14 | 48.3 | 14.7 | 0.43 |
| B | 6 | — | 7.5 | 13.5 | 48.2 | 13.9 | 0.46 |
| C | 8 | — | 3.5 | 11.5 | 47.5 | 14.6 | 0.45 |
| D | 4 | — | 5 | 9 | 43.6 | 12.1 | 0.49 |
| E | 6.5 | — | — | 6.5 | 42.5 | 12.9 | 0.5 |
| F | 3.25 | — | — | 3.25 | 38.3 | 10.0 | 0.6 |
| G | 2 | — | 2.5 | 4.5 | 37.8 | 9.8 | 0.53 |
| H | — | 8 | 6 | 14 | 49.0 | 13.1 | 0.33 |
| I | — | 6 | 7.5 | 13.5 | 47.1 | 13.2 | 0.33 |
| J | — | 8 | 3.5 | 11.5 | 46.9 | 11.3 | 0.33 |
| K | — | 4 | 5 | 9 | 43.5 | 10.8 | 0.38 |
| L | — | 6.5 | — | 6.5 | 44.2 | 11.6 | 0.35 |
| M | — | 3.25 | — | 3.25 | 39.0 | 10.0 | 0.42 |
| N | — | 2 | 2.5 | 4.5 | 37.8 | 10.3 | 0.41 |

We have found that using the low amounts of pore former, and in particular low amounts of graphite, as disclosed herein can help improve drying of the wet green body. We have also found that using the low amounts of pore former, and in particular low amounts of graphite, as disclosed herein can help reduce cracking of the green body when dried and/or fired.

It should be understood that while the present invention has been described in detail with respect to certain illustrative and specific embodiments thereof, it should not be considered limited to such, as numerous modifications are possible without departing from the broad scope of the present invention as defined in the appended claims.

What is claimed is:

1. A method of manufacturing an aluminum titanate containing ceramic article, comprising the steps of:
    mixing inorganic batch materials with a pore former to form a batch composition, wherein the pore former is in less than 15%, by weight, of the inorganic batch material, the pore former consisting essentially of starch;
    adding an organic binder and a solvent to the batch composition and further mixing to form a plasticized mixture;
    forming a green body from the plasticized mixture; and
    firing the green body to produce a predominant phase of aluminum titanate.

2. The method of claim 1 wherein the fired ceramic article has a median pore size less than 15.0 μm.

3. The method of claim 1 wherein the fired ceramic article has a pore size distribution with $(d_{50}-d_{10})/d_{50}$ of less than 0.7.

4. The method of claim 1, wherein the pore former is from about 1% to about 8%, by weight, of the inorganic batch materials.

5. The method of claim 1, wherein the pore former is from about 3% to about 7%, by weight, of the inorganic batch materials.

* * * * *